(12) United States Patent
Minowa et al.

(10) Patent No.: US 7,751,008 B2
(45) Date of Patent: Jul. 6, 2010

(54) LIQUID CRYSTAL DISPLAY AND METHOD OF MANUFACTURING A LIQUID CRYSTAL DISPLAY WITH A BARRIER FORMED OF TFT MATERIALS

(75) Inventors: Kenichi Minowa, Kumamoto (JP); Takeshi Ohashi, Kumamoto (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 891 days.

(21) Appl. No.: 11/256,985

(22) Filed: Oct. 25, 2005

(65) Prior Publication Data

US 2006/0132701 A1 Jun. 22, 2006

(30) Foreign Application Priority Data

Dec. 17, 2004 (JP) .............................. 2004-365304

(51) Int. Cl.
G02F 1/13 (2006.01)
G02F 1/1337 (2006.01)

(52) U.S. Cl. ...................................... 349/126; 349/187

(58) Field of Classification Search ......... 349/123–126, 349/187
See application file for complete search history.

(56) References Cited

U.S. PATENT DOCUMENTS 6,646,709 B2 11/2003 Matsumoto
6,873,385 B2 3/2005 Matsumoto
2002/0036738 A1* 3/2002 Matsumoto .................. 349/123
2003/0193639 A1* 10/2003 Nagano et al. .............. 349/141
2005/0237469 A1* 10/2005 Kadotani et al. ............ 349/155

FOREIGN PATENT DOCUMENTS

| JP | 9-43629 | | 2/1997 |
| JP | 09043629 | A * | 2/1997 |
| JP | 09-244043 | | 9/1997 |
| JP | 2001-075113 | A | 3/2001 |
| JP | 2001075113 | A * | 3/2001 |

(Continued)

OTHER PUBLICATIONS

Official Action issued by the Korean Intellectual Property Office in corresponding KR Application No. 10-2005-0124465, Jun. 20, 2007; and English translation thereof.

(Continued)

Primary Examiner—David Nelms
Assistant Examiner—Jessica M Merlin
(74) Attorney, Agent, or Firm—Buchanan Ingersoll & Rooney PC (57) ABSTRACT

In a neighborhood of a display area in a liquid crystal display formed is a barrier for acquiring foreign matters. A method of manufacturing the barrier has a step of forming a TFT and forming the barrier of the same materials as a plurality of materials constituting the TFT at the same time. Thus provided is a manufacturing method which allows the foreign matters caused by a brush cleaning to be held back and acquired outside the display area and avoids a defect due to a short circuit made by the foreign matters between adjacent pixels or with a counter electrode substrate.

22 Claims, 9 Drawing Sheets

FOREIGN PATENT DOCUMENTS

| | | | |
|---|---|---|---|
| JP | 2001-318380 | | 11/2001 |
| JP | 2002-033331 | A | 1/2002 |
| JP | 2002-090749 | A | 3/2002 |
| JP | 2004-117694 | | 4/2004 |
| JP | 2004117694 | A * | 4/2004 |
| JP | 2004-240142 | | 8/2004 |
| KR | 2002-0008062 | A | 1/2002 |

OTHER PUBLICATIONS

Japanese Office Action for Application No. 2004-365304, dated May 7, 2008 and its English translation.

Chinese Office Action for Application No. 200510131772X, dated Mar. 14, 2008 and its partial English translation.

Office Action in JP 2004-365304 dated Oct. 7, 2008, and a English Translation Thereof.

\* cited by examiner

LIQUID CRYSTAL DISPLAY AND METHOD OF MANUFACTURING A LIQUID CRYSTAL DISPLAY WITH A BARRIER FORMED OF TFT MATERIALS

BACKGROUND OF THE INVENTION

1. Field of the Invention

The present invention relates to a method of manufacturing a liquid crystal display of active matrix type or the like which is driven by a thin film transistor (hereinafter, referred to as "TFT") formed on a glass substrate, and a liquid crystal display manufactured by the method.

2. Description of the Background Art

In a process of manufacturing a liquid crystal display, especially in a process of manufacturing an active matrix type TFT liquid crystal panel, the process step in which something is in contact with a TFT array surface of a glass substrate is a brush cleaning step or a rubbing step before the panel assembly. A transparent conductive film which is to be display pixels is formed on a substrate surface in the brush cleaning and an orientation film is formed on a transparent electrode of the substrate surface in rubbing, and foreign matters such as transparent conductive film scraps, orientation film scraps, metal film scraps or the like are caused by contact between a cleaning roll brush or a rubbing roller cloth and the substrate surface. When such foreign matters are mixed into a display area, these make a short circuit between electrodes and irregularity in orientation of a liquid crystal, to cause a defect.

Among countermeasures against the above problem, i.e., prevention measures for scattering of various foreign matters into the display area in rubbing are a technique disclosed in e.g., Japanese Patent Application Laid Open Gazette No. 9-43629 (Patent Document 1: p. 8, FIG.4) where dummy pixels are formed around the display pixels, to acquire orientation film scraps and metal film scraps of the rubbing roller cloth by utilizing a level difference between the dummy pixels and a periphery of the dummy pixels, a technique disclosed in e.g., Japanese Patent Application Laid Open Gazette No. 2004-240142 (Patent Document 2: p. 11, FIG.2) where part of an orientation film is formed higher and by utilizing the level difference, the orientation film scraps and the metal film scraps of the rubbing roller cloth are acquired, and a case disclosed in e.g., Japanese Patent Application Laid Open Gazette No. 2001-318380 (Patent Document 3: p. 5, FIG.2) where projections and depressions are formed of an insulating film in a region where no orientation film is formed and foreign matters, the metal film scraps and the orientation film scraps attached to the rubbing roller cloth are acquired by the grooves.

In the conventional case where the dummy pixels are formed around the display pixels, the height of the dummy pixels from the glass substrate is equal to the height of the transparent conductive film and therefore transparent conductive film scraps caused in the brush cleaning step for cleaning a surface of a substrate before formation of the orientation film can not be sufficiently removed, and since the transparent conductive film is also formed on the dummy pixels, this technique produces an adverse effect for transparent conductive film scraps created from the dummy pixels in brush cleaning or rubbing.

Also in the conventional case where the level difference is formed by using the orientation film, no consideration is given to removal of the transparent conductive film scraps caused in the brush cleaning step for the substrate, which is performed before formation of the orientation film. Further, if an orientation film which is thicker than the thickness of the orientation film on the display area is formed in the peripheral region, there is a possibility that the orientation film is removed or chipped in rubbing, to cause orientation film scraps.

Still also in the case where an uneven portion for removing the foreign matters is formed outside the orientation film to acquire the fiber scraps of the rubbing roller cloth and the foreign matters and the orientation film scraps attached to the cloth, the transparent conductive film scraps can not be fully removed since the scraps are created also in a portion to which the orientation film is applied. Different from the fiber scraps of the rubbing roller cloth and the orientation film scraps, the transparent conductive film scraps are hard to remove even when cleaning with water or an organic solvent or supersonic cleaning is performed. Further, if the uneven portion for removing the foreign matters which is formed of a chromium film and an insulating film is manufactured by a presently general technique, the level of the portion becomes lower than the average level of the display area and therefore no sufficient effect of acquiring the foreign matters can not be produced in the brush cleaning step. Furthermore, in order to form the uneven portion for removing the foreign matters, an additional step of forming projections and depressions is needed, which leads to an increase in manufacturing cost.

SUMMARY OF THE INVENTION

It is an object of the present invention to provide a manufacturing method which allows transparent conductive film scraps caused by a brush cleaning to be held back and acquired outside a display area and avoids a defect due to a short circuit made by the transparent conductive film scraps between adjacent pixels or with a counter electrode substrate. It is another object of the present invention to prevent foreign matters caused by rubbing from scattering into the display area without addition of another step.

The present invention is intended for a method of manufacturing a liquid crystal display in which a first substrate having a TFT array and a conductive film forming a pixel portion driven by the TFT array in a display area, and a second substrate are bonded with a gap interposed therebetween and a liquid crystal is held in the gap. According to the present invention, the method includes a TFT array forming step. The TFT array forming step is to form the TFT array on the first substrate and a barrier of the same materials as a plurality of materials constituting the TFT array in at least part of neighborhood of the display area at the same time.

Since the TFT array is formed on the TFT array substrate and the barrier is formed of the same materials as a plurality of materials constituting the TFT array at the same time, the barrier which is higher than the average level of the display area can be formed and this produces a sufficient effect of acquiring foreign matters in a brush cleaning step and a rubbing step. Further, the present invention eliminates addition of another step for forming the barrier.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
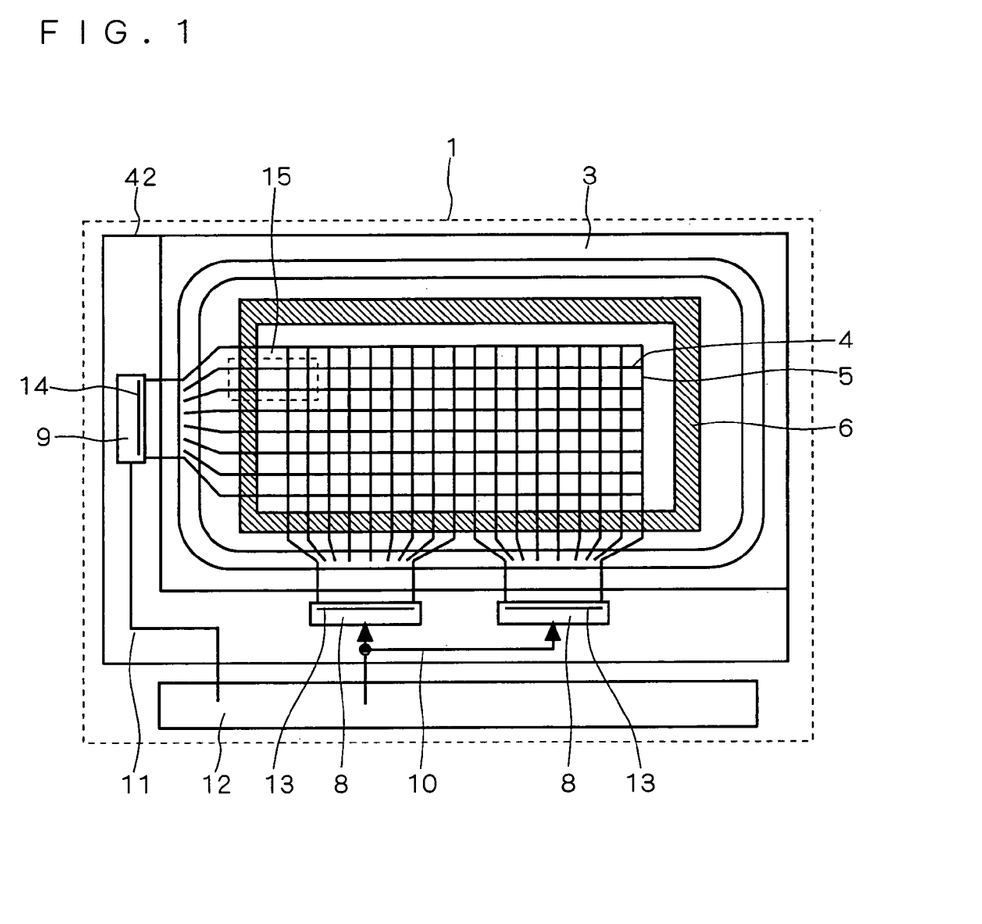
FIG. 1 is a diagram showing a liquid crystal display in accordance with first and second preferred embodiments of the present invention.

Discussion will be made below on an exemplary case of adopting the present invention for a method of manufacturing a liquid crystal display. FIG. 1 is a plan view showing a liquid crystal display manufactured by a method in accordance with the first preferred embodiment of the present invention. In the liquid crystal display 1 of FIG. 1, a first substrate 3 (hereinafter, referred to as "TFT array substrate") is constituted of a glass substrate 42, a display area 2 and a barrier 6. The display area 2 has a structure in which pixel portions divided by gate lines 4 and source lines 5 formed on the glass substrate 42 and TFT arrays for driving the pixel portions are formed in a matrix, and is surrounded by the circumferential barrier 6 and a seal 7 for sealing a not-shown liquid crystal. The TFT array substrate 3 and a not-shown second substrate (hereinafter, referred to as "counter substrate") hold the liquid crystal by the seal 7 with an appropriate gap therebetween.

A liquid crystal driving circuit is constituted of a source driver 8 and a gate driver 9 which are mounted by COG (Chip On Glass) on the TFT array substrate 3 and a control substrate 12 for supplying the source driver 8 and the gate driver 9 with a display signal 10 and a control signal 11, and outputs from the source driver 8 and the gate driver 9 are connected to the source line 5 and the gate line 4 through terminal regions 13 and 14.

Figure 2:
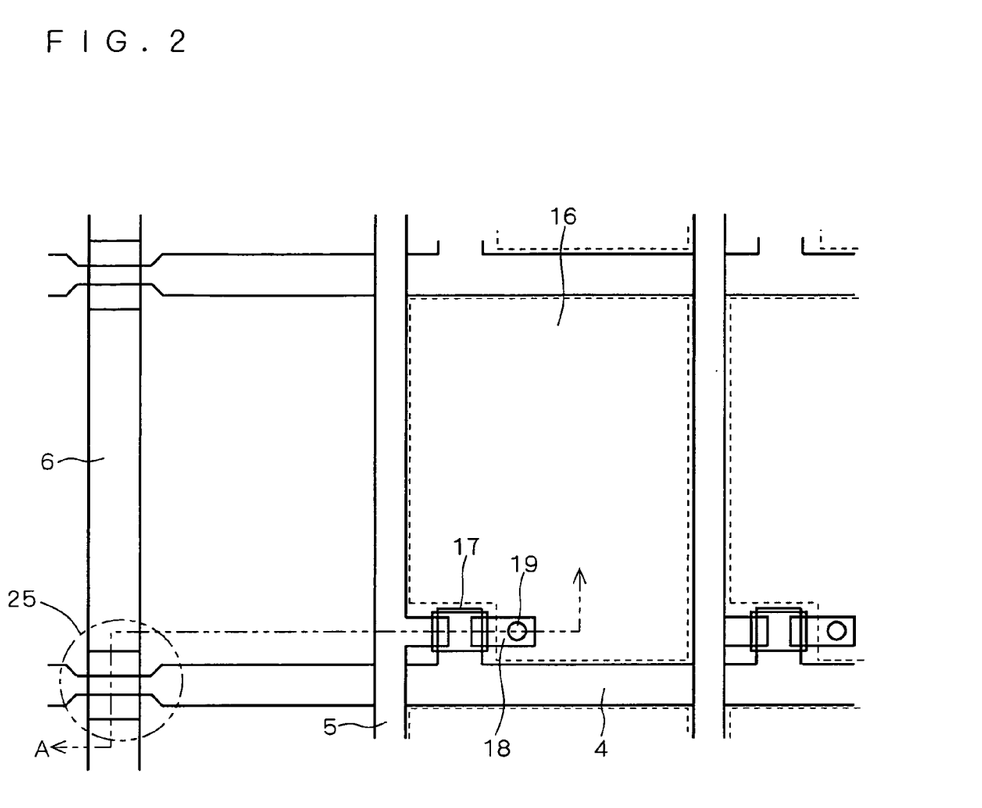
FIG. 2 is a plan view showing a pixel portion and a barrier in accordance with the first and second preferred embodiments of the present invention.

In FIG. 1, a region 15 surrounded by the dotted line, including the pixel portion and the barrier, is constituted of the pixel portion on the left end row of FIG. 1, which is a constituent of the display area 2, and the barrier 6, and its expanded view is shown in FIG. 2. In FIG. 2, reference numeral 16 represents a pixel portion which is a constituent of the display area 2 having a matrix pattern and formed of a transparent conductive film which applies a voltage to the liquid crystal. In the first preferred embodiment, discussion will be made using a general transmission type liquid crystal display as an example of the liquid crystal display 1. As the transparent conductive film forming the pixel portion 16, ITO (Indium Tin Oxide) is adopted. Hereinafter, the transparent conductive film is referred to as ITO. The pixel portion 16 is brought into conduction through a drain terminal 18 of a TFT 17 and a contact hole 19 and driven by the TFT 17. The barrier 6 is provided, extending vertically in FIG. 2, away from the left most source line 5 of display area 2 at a predetermined distance, and surrounds the display area 2 on the whole as shown in FIG. 1.

Figure 3:
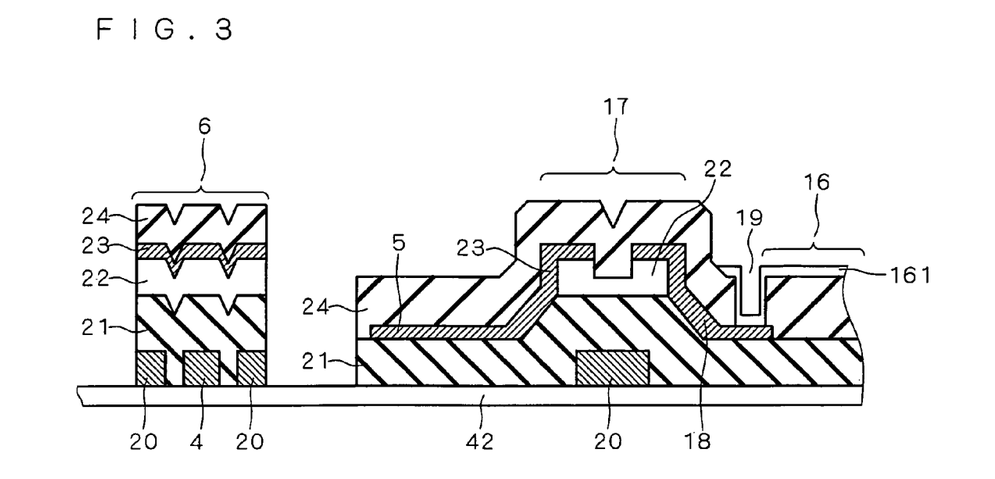
FIG. 3 is a cross section showing the pixel portion and the barrier in accordance with the first preferred embodiment of the present invention.

As an example of sectional structure of the barrier 6, the TFT 17 and the contact hole 19, the cross section taken along the line A-A of FIG. 2 is shown in FIG. 3. In FIG. 3, the TFT 17 is a general-type reverse stagger-type transistor and as discussed above, the drain terminal 18 is connected to an ITO film 161 of the pixel portion 16 at the contact hole 19. The barrier 6 is constituted of a gate layer 20 or the gate line 4, a gate insulating film 21, a semiconductor layer 22, a source/drain layer 23 and a protection film 24 from the lower layer, and the highest layer is the protection film 24 and the ITO film 161 which is a constituent of the pixel portion 16 is not formed thereon. The gate layer 20 in the barrier 6 is the same layer as the gate line 4 of FIG. 2 and the gate layer 20 in the TFT 17 and formed of the same metal at the same time. Further, the gate insulating film 21 and the semiconductor layer 22 in the barrier 6 are formed of the same metal as that of the insulating film 21 and the semiconductor layer 22 in the TFT 17 at the same time. Similarly, the source/drain layer 23 in the barrier 6 is the same layer as the source line 5, the drain terminal 18 and the source/drain layer 23 in the TFT 17 and formed of the same metal at the same time.

As shown in FIG. 2, at an intersection 25 between the gate line 4 and the barrier 6, the gate layer 20 is separated from the gate line 4 by the gate insulating film 21, to prevent a short circuit between adjacent gate lines. The gate line 4 is made thinner at the intersection 25 than those in other portions, to prevent an increase of stray capacitance in the gate line 4 at the intersection.

Figure 4:
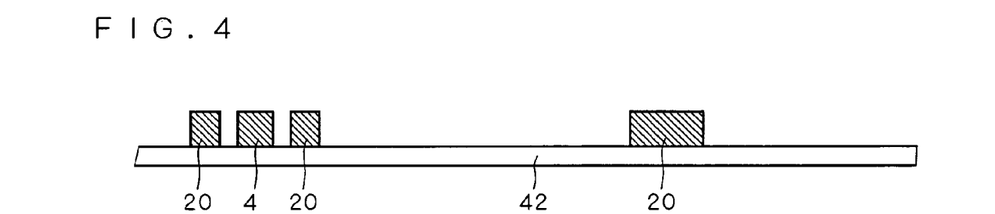
FIG. 4 is a cross section showing a state after the step of forming a gate layer and a gate line in accordance with the first and second preferred embodiments of the present invention.
Figure 5:
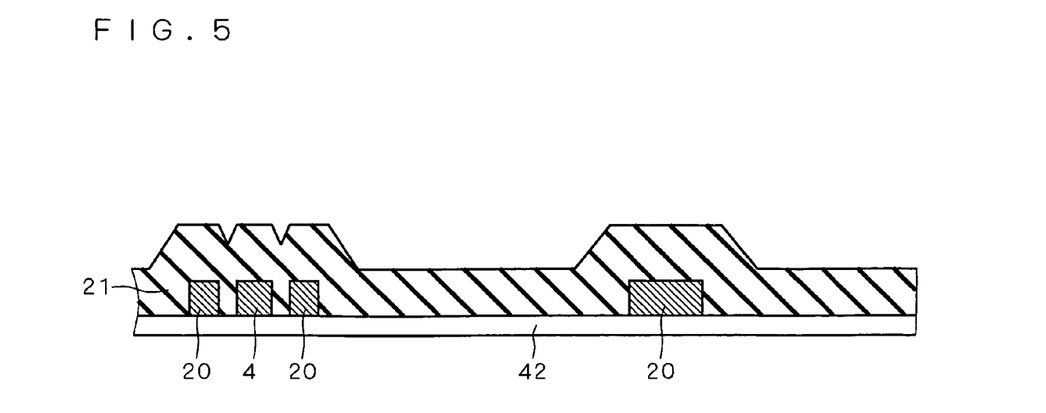
FIG. 5 is a cross section showing a state after the step of forming a gate insulating film in accordance with the first and second preferred embodiments of the present invention.
Figure 6:
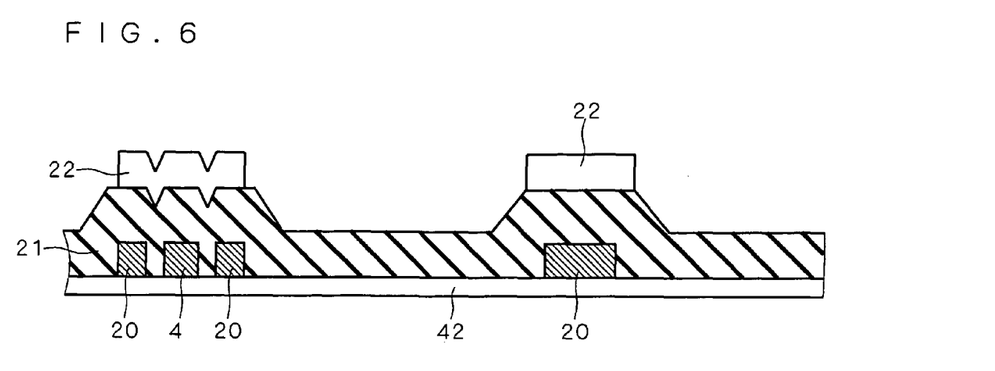
FIG. 6 is a cross section showing a state after the step of forming a semiconductor layer in accordance with the first and second preferred embodiments of the present invention.
Figure 7:
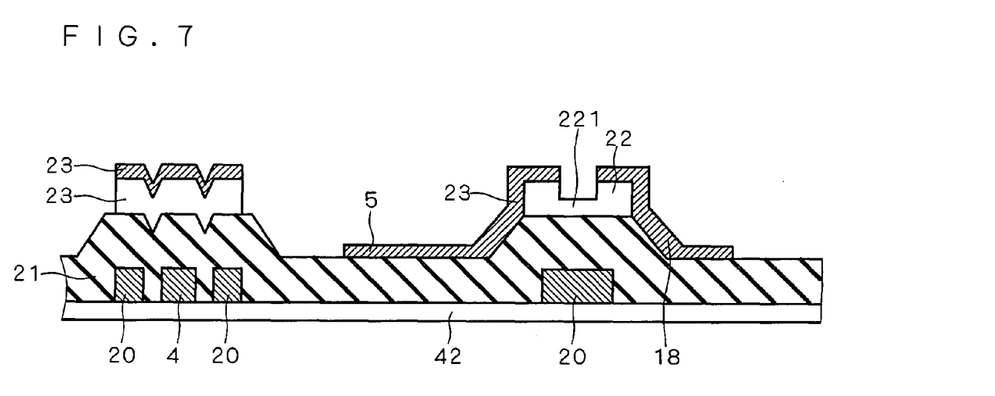
FIG. 7 is a cross section showing a state after the steps of forming a source/drain layer, etching and etching the semiconductor layer in accordance with the first and second preferred embodiments of the present invention.
Figure 8:
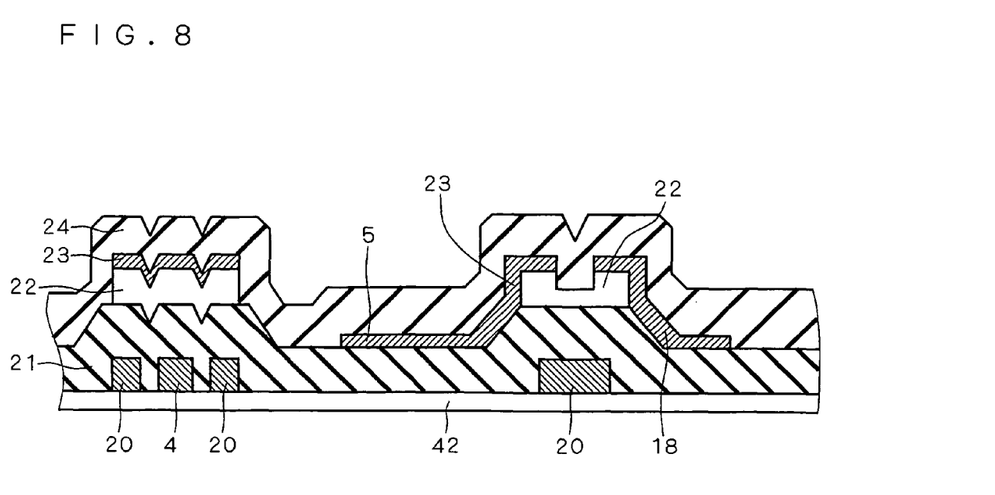
FIG. 8 is a cross section showing a state after the step of forming a protection film in accordance with the first and second preferred embodiments of the present invention.
Figure 9:
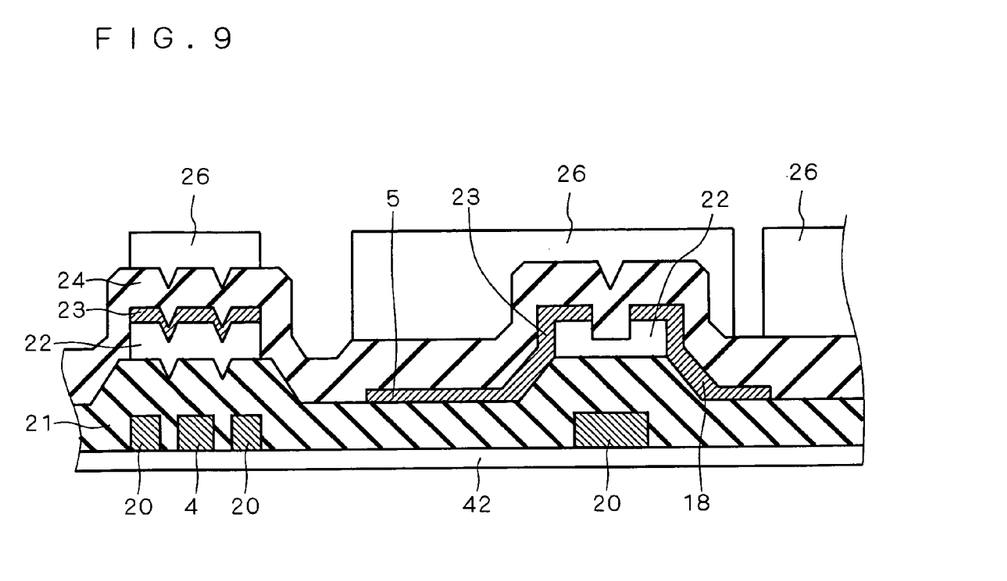
FIG. 9 is a cross section showing a state after the step of applying a resist for etching of the protection film and the gate insulating film and the step of etching in accordance with the first preferred embodiment of the present invention.

Next, a method of manufacturing the TFT array substrate 3 on which the barrier 6 and the TFT 17 having the above sectional structures are formed will be discussed step by step, referring to figures. As shown in FIG. 4, first, the gate line 4, a gate electrode of the TFT 17 and the gate layer 20 which is the lowest layer of the barrier 6 are formed of the same material on a surface of the glass substrate 42 and etched. Next, after forming the gate insulating film 21 as shown in FIG. 5, the semiconductor layers 22 are formed of the same material and etched at the same time as shown in FIG. 6. Next, as shown in FIG. 7, the source line 5, the source/drain layer 23 forming a source electrode and a drain electrode 18 of the TFT 17 are formed of the same material on an upper surface of the semiconductor layer 22 and etched at the same time. After that, the upper surface of the semiconductor layer 22 is partially etched to make a recess by using the source/drain layer 23 as a mask, to form a channel 221 of the TFT 17. Next, the protection film 24 shown in FIG. 8 is formed over upper surfaces of those elements and then a resist 26 shown in FIG. 9 is applied thereto and exposed and developed, and an unnecessary portion of the resist is removed to etch the contact hole 19 and the barrier 6 shown in FIG. 10. By using the resist 26 as a mask, exposed portions of the gate insulating film 21 and the protection film 24 are partially removed by etching.

Figure 10:
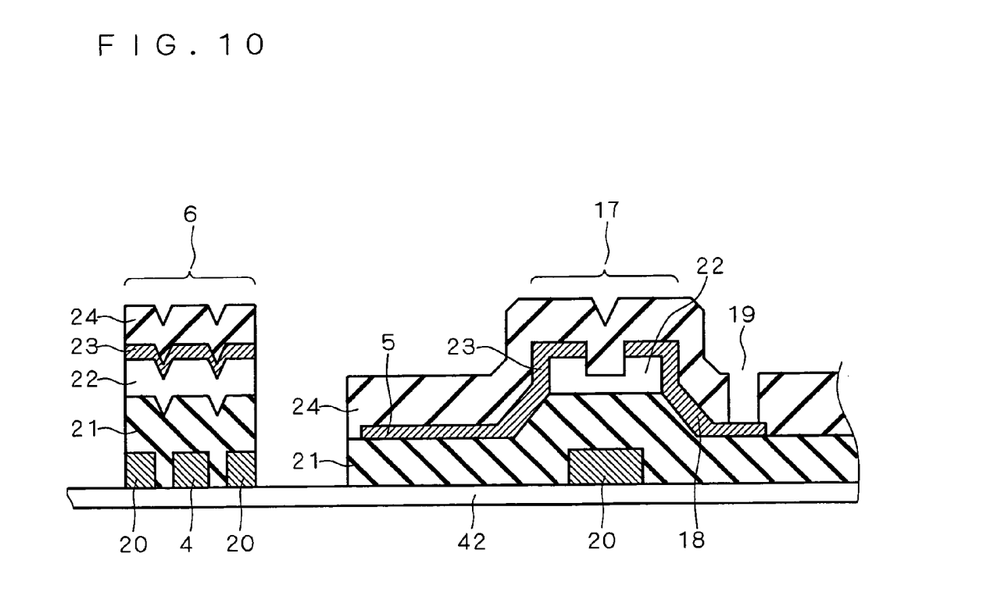
FIG. 10 is a cross section showing a state after the step of etching the protection film and the gate insulating film in accordance with the first preferred embodiment of the present invention.
Figure 11:
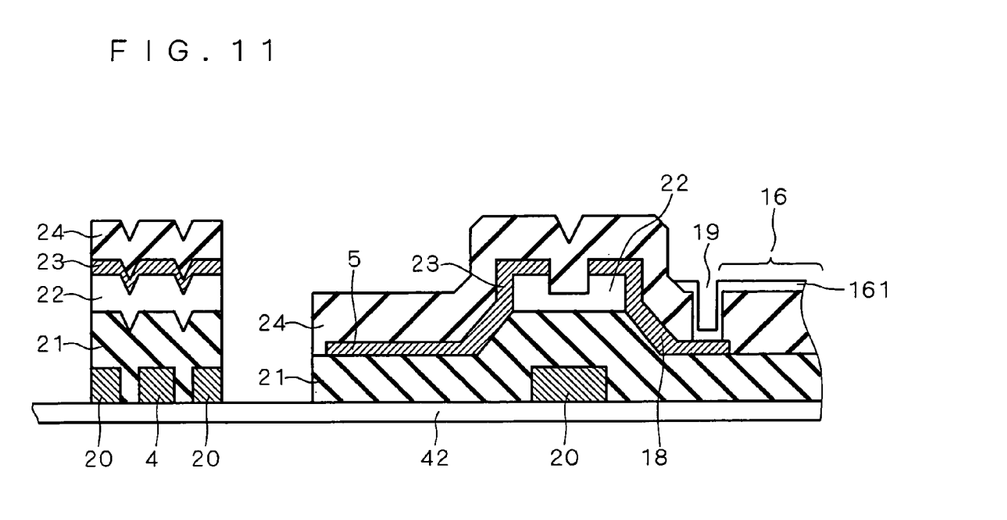
FIG. 11 is a cross section showing a state after the step of forming an ITO in accordance with the first preferred embodiment of the present invention.

Through the above process, the barrier 6 and the TFT 17 shown in FIG. 10 are formed of the same material at the same time. After that, the ITO film 161 is formed only on the upper portion of the contact hole 19 and the pixel portion 16 shown in FIG. 11 and etched, to connect the drain terminal 18 of the TFT 17 with the pixel portion 16 formed of the ITO film 161. No ITO film is formed on the barrier 6.

The gate layer 20 and the source/drain layer 23 are formed of metal films (Al, Cr, Mo or the like) on the glass substrate 42 by the CVD method or the sputtering method. For the gate insulating film 21 and the protection film 24, in general, silicon nitride (SiN) is used.

The height of the barrier 6 formed through the above process is about 1.5 to 2 µm, which is almost equal to that of the TFT 17, and the barrier 6 is higher than the pixel portions 16 almost occupying the display area 2 by the heights of the gate layer 20 and the semiconductor layer 22. The ITO film 161 of the pixel portion 16 is thin, having a thickness of 0.1 µm or less, and even when the thickness of the ITO film 161 is added, the barrier 6 is sufficiently higher than the pixel portions 16. As to the width of the barrier 6, its maximum value can be freely determined within tolerance on the contour of the liquid crystal display 1 and its minimum value is usually determined to be 5 µm or more since the barrier 6 has to have a strength to prevent removal in roll brush cleaning.

Thus, since the barrier 6 is formed of the same metal film as that of the TFT array at the same time in the manufacturing process of the TFT array substrate, it becomes possible to form the barrier which is higher than the average height of the display area 2 around the display area 2 in a simple process without any additional step.

Next, the TFT array substrate 3 which is manufactured through the above process is subjected to the above-discussed panel assembly process. In the panel assembly process, generally, steps of applying an orientation film, rubbing, applying a seal, superimposing the TFT array substrate 3 onto a counter substrate, hardening the seal, injecting a liquid crystal and sealing an inlet for injection are performed in this order. In the precedent step of the first step of the panel assembly process, i.e., the step of applying the orientation film, a brush cleaning is performed to remove scraps and foreign matters attached to the TFT array substrate 3 during storage. In the brush cleaning, generally, a rolling brush is used.

Figure 12:
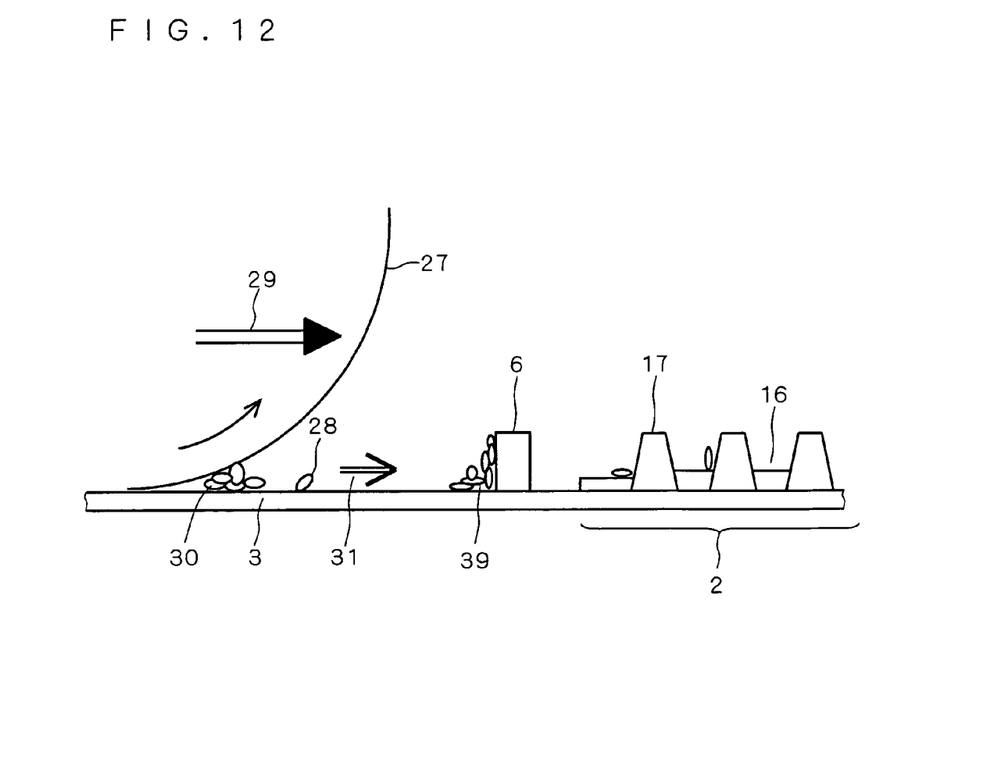
FIG. 12 is a schematic diagram showing the step of brush cleaning in accordance with the first or second preferred embodiment of the present invention.

FIG. 12 shows an action of a roll brush 27 which is generally used in the above-discussed brush cleaning step and the movement of the foreign matters 28. In FIG. 12, the roll brush 27 first comes into contact with the periphery of the display area 2 and then moves towards the display area 2. The foreign matters 28 are once swept and gathered into the gap 30, specifically, a gap between the roll brush 27 and the TFT array substrate 3, by the roll brush 27 along its rolling and moving direction 29 and then moved in a moving direction 31, specifically, a direction from the outside of the display area 2 towards the barrier 6. The foreign matters 28 mainly consist of ITO scraps which are removed from the pixel portion 16 in the TFT array substrate 3 which is subjected to brush cleaning immediately before and attached to the roll brush 27 and ITO scraps and other metal film scraps which are removed from an edge of the substrate during cleaning, and each have a size of about 0.02 to 0.05 µm. Since the barrier 6 has a height of about 1.5 to 2 µm, as discussed above, and is formed at the peripheral region, the foreign matters 28 are first held back by the level difference of the barrier 6 and acquired at a left side wall of the barrier 6 as acquired foreign matters 32. The roll brush 27 from which the foreign matters are removed by the barrier 6 then goes in the moving direction 29, to clean the display area 2.

Herein, if the barrier 6 is not formed, the foreign matters 28 aggregated into a big sized one as shown in the figure are scattered into the display area 2. Though the TFT 17 is almost as high as the barrier 6, since the TFT 17 is formed to have a size as small as possible at a lower-left corner of the pixel portion 16 in order to increase its transmittance, no effect of holding back the foreign matters 28 is expected. Therefore, there is a high probability that the conductive foreign matters 28 aggregated into a big sized one in the gap 30 should be scattered onto the pixel portion 16. When the aggregated foreign matters 28 are scattered into the display area 2, this makes a short circuit between the pixel portion 16 and the counter electrode or between the adjacent pixel portions 16, to cause a pixel defect.

In the brush cleaning step, the pressure with which the roll brush 27 is pushed against the TFT array substrate 3 is determined in consideration of the condition under which the display area 2 is fully cleaned and the ITO film of the pixel portion 16 is hard to remove. If the pressure becomes too higher, in other words, the space between the glass substrate 42 and the roll brush 27 becomes too narrower, the ITO film becomes more likely to be removed. In the first preferred embodiment, as shown in FIG. 3, since the barrier 6 is so formed of a plurality of materials which constitute the TFT array substrate 3 as to become higher than the average level of the display area 2, it becomes easy to acquire the foreign matters 28. Further, the foreign matter 28 has a size of about 0.02 to 0.05 µm, as discussed above. Since the barrier 6 is formed as discussed above, most of the swept and gathered foreign matters 28 can be acquired as the acquired foreign matters 32.

Further, since no ITO film is formed on the barrier 6, as discussed above, even when the barrier 6 is formed to be higher than the average level of the display area 2, this does not cause the problem that the ITO film should be removed from a surface of the barrier 6 in the brush cleaning step and built up in the display area after that.

Figure 13:
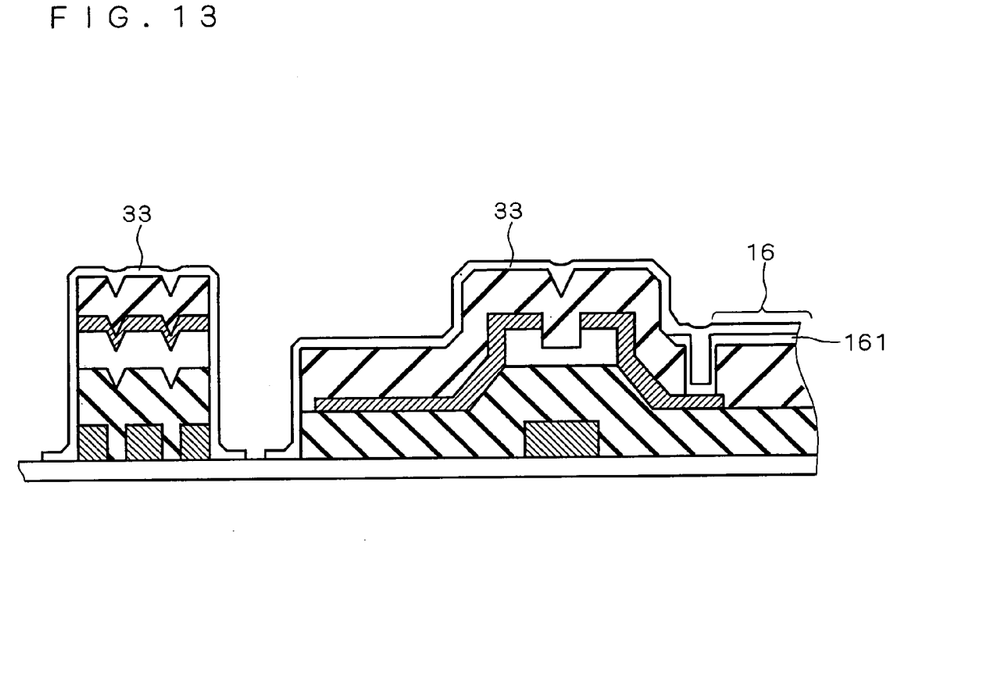
FIG. 13 is a cross section showing a state after the step of forming an orientation film in accordance with the first preferred embodiment of the present invention.

Next, discussion will be made on an action of the barrier 6 in the rubbing step. The above-discussed panel assembly process includes the orientation film applying step before the rubbing step, and in this step, an orientation film 33 is formed not only on the display area 2 but also on an upper portion of the barrier 6 as shown in FIG. 13 in the first preferred embodiment. The orientation film 33 is formed in the orientation film applying step. Specifically, the orientation film 33 can be easily formed only by adding a pattern of the barrier 6 surrounding the display area 2 to a transfer plate determining a range of applying the orientation film. The level of the barrier 6 after application of the orientation film 33 is higher than at least the level of the pixel portion 16 and this increases the effect of acquiring the foreign matters.

Figure 14:
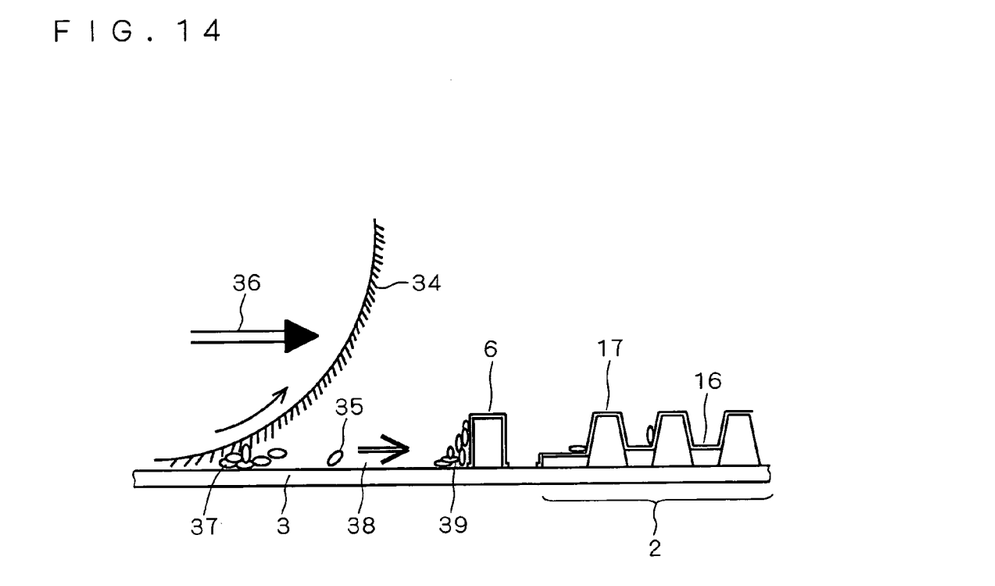
FIG. 14 is a schematic diagram showing the step of rubbing in accordance with the first or second preferred embodiment of the present invention.

Herein, discussion will be made on a manner of acquiring the foreign matters in the rubbing step. Considered is a case where a rubbing roller cloth is used instead of the roll brush 27 in FIG. 12. FIG. 14 shows an action of the rubbing roller cloth 34 in the rubbing step and the movement of foreign matters 35. In FIG. 14, the rubbing roller cloth 34 first comes into contact with the periphery of the display area 2 and then moves towards the display area 2. The foreign matters 35 are once swept and gathered into a gap 37, specifically, a gap between the rubbing roller cloth 34 and the TFT array substrate 3, by the rubbing roller cloth 34 along its rolling and moving direction 36 and then moved in a moving direction 38, specifically, a direction from the outside of the display area 2 towards the barrier 6.

The foreign matters 35 mainly consist of orientation film scraps which are removed from the pixel portion 16 in the TFT array substrate 3 which is subjected to rubbing immediately before and attached to the rubbing roller cloth 34 and metal film scraps and orientation film scraps removed from the edge of the substrate, and each have a size of about 0.15 to 0.2 μm and if aggregated clusters of the foreign matters are scattered into the display area 2, these make a short circuit and poor orientation to cause a bright defect. Since the barrier 6 has a height of about 1.5 to 2 μm, as discussed above, and is formed at the peripheral region, the foreign matters 35 are first held back by the level difference of the barrier 6 and acquired at the left side wall of the barrier 6 as acquired foreign matters 39. The rubbing roller cloth 34 from which the foreign matters 35 are removed by the barrier 6 then goes in the moving direction 36 while rolling in a direction indicated in FIG. 14 and comes into contact with the orientation film of the display area 2 to perform rubbing.

Thus, by forming the barrier 6 in the periphery of the display area 2, it becomes possible to acquire the foreign matters 35 also in the rubbing step and suppress a display failure.

In the above preferred embodiment, the barrier 6 surrounds the display area 2 as shown in FIG. 1 and is positioned between the terminal region 14 of the gate line 4 and the display area 2 in the lateral direction of FIG. 1 and further separates the gate line 4 and the gate layer 20 from each other at the intersection between the barrier 6 and the gate line 4, to thereby prevent a short circuit between the adjacent gate lines. Similarly, the barrier 6 is positioned between the terminal region 13 of the source line 5 and the display area 2 in the longitudinal direction of FIG. 1 and separates the source line 5 and the source/drain layer 23 from each other at the intersection between the barrier 6 and the source line 5, to thereby prevent a short circuit between the adjacent source lines. Further, since the barrier 6 is provided between the terminal regions 13 and 14 and the display area 2 to sufficiently utilize the space therebetween, it is possible to avoid upsizing of the TFT array substrate 3 due to provision of the barrier 6. Furthermore, by intersecting the barrier 6 and the gate line 4 or the barrier 6 and the source line 5 as above, it is also possible to form the barrier 6 very near the display area 2, to suppress the foreign matters which are created therebetween.

Though the barrier 6 surrounds the display area 2 in the above case, if the direction of brush cleaning and rubbing is determined in advance for the steps and there is no possibility of changing the direction, the barrier 6 may be formed in the longitudinal direction or the lateral direction of the display area 2 or both directions thereof in the figure, and if a design allows, a plurality of barriers 6 may be formed on the upside, the downside, the left side and the right side of the display area 2 and this obviously produces the same effect as that in the first preferred embodiment.

Further, though discussion has been made in the first preferred embodiment on the case where the barrier 6 linearly surrounds the display area, if the foreign matters can be acquired, it is not particularly necessary to linearly surround the display area, and if a design allows a region for provision to be ensured, the barrier 6 may surround the display area in a zigzag manner, like a square wave or the like, to thereby produce the same effect of acquiring the foreign matters as that in the first preferred embodiment.

Though the barrier 6 is formed between the display area 2 and the seal 7 in FIG. 1, only if the barrier 6 is formed in a peripheral region outside the display area 2, the barrier 6 may be formed outside the seal 7 and anywhere.

Furthermore, the first preferred embodiment has been discussed on the case where a transparent ITO metal is used as the conductive material for the pixel portion 16, the conductive material is not limited to this but other conductive materials may be used. When the liquid crystal display 1 is a reflection display, for example, a nontransparent metal of high reflectance, such as aluminum (Al) or silver (Ag), is used as the conductive film forming the pixel portion 16. Further, even when the pixel portion 16 is separately formed of a nontransparent metal and a transparent metal (in a case of semitransparent display), it is obvious that the same effect of acquiring the foreign matters as that in the first preferred embodiment can be produced.

The Second Preferred Embodiment

In the above-discussed first preferred embodiment, as can be clear from the form of the resist 26 of FIG. 9 and the sectional structure of FIG. 3, on the side surface of the barrier 6, the metal layers such as the gate layer 20, the semiconductor layer 22 and the source/drain layer 23 are exposed.

Figure 15:
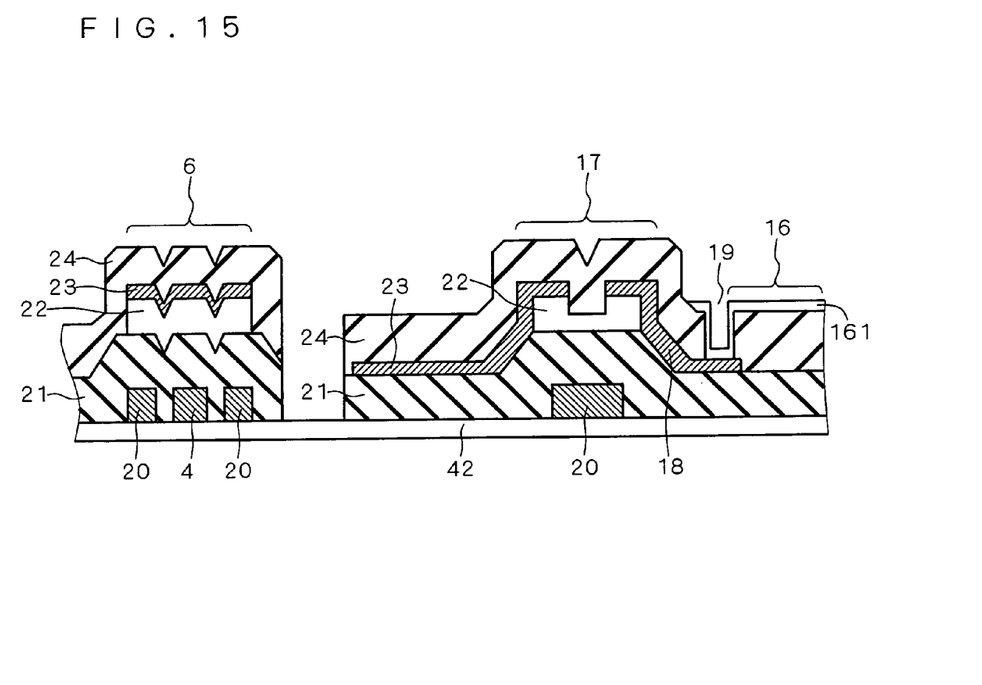
FIG. 15 is a cross section showing the pixel portion and the barrier in accordance with the second preferred embodiment of the present invention.
Figure 16:
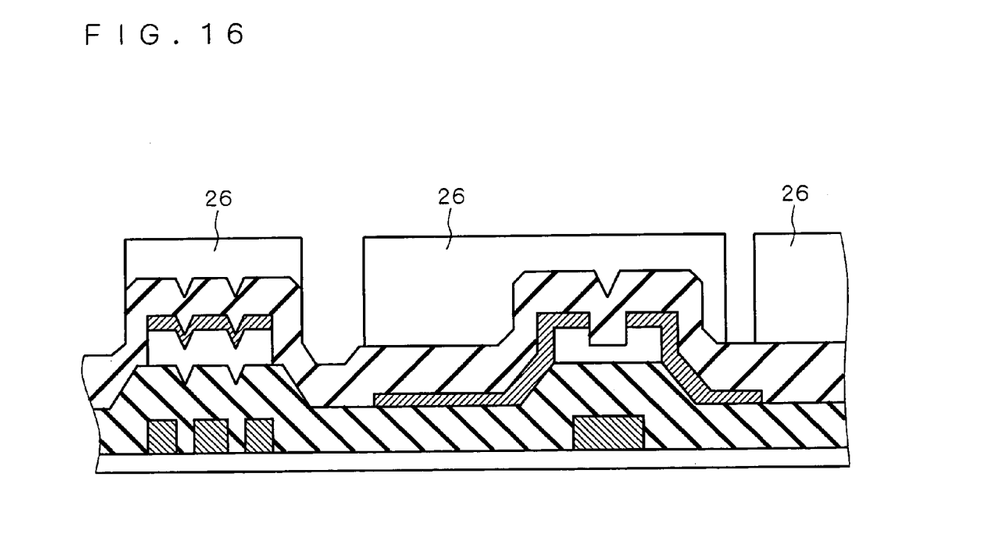
FIG. 16 is a cross section showing a state after the step of applying a resist for etching of the protection film and the gate insulating film and the step of etching in accordance with the second preferred embodiment of the present invention.

When the metals are exposed on the side wall surface, however, the resistance to metallic corrosion due to penetration of a very small amount of water in the liquid crystal may be reduced, depending on the kind of the used metal film. In such a case, as shown in the cross section of the barrier 6 of FIG. 15, by leaving the gate insulating film 21 and the protection film 24 on the side wall surface of the barrier 6, it is possible to improve the resistance to corrosion. This can be easily achieved by extending an area in the upper portion of the barrier 6, which is covered with the resist, like the form of the resist 26 as shown in FIG. 16. Other than the above, the manufacturing process of the TFT 17 and the barrier 6 and the manner of brush cleaning as shown in FIG. 12 are the same as those in the first preferred embodiment and discussion on the other manufacturing process steps will be omitted.

As discussed above, in the case where the gate insulating film 21 and the protection film 24 are left on the side wall surface of the barrier 6, the sectional structure of the barrier 6 is, more or less, a trapezoid. This is effective as a prevention measure for corrosion in the case where the barrier 6 is kept in contact with outside air for a long time, such as a case where the barrier 6 is provided outside the seal 7 as discussed above or a case where the TFT array substrate after being manufactured is stored for a long time before the panel assembly process.

The Third Preferred Embodiment

Figure 17:
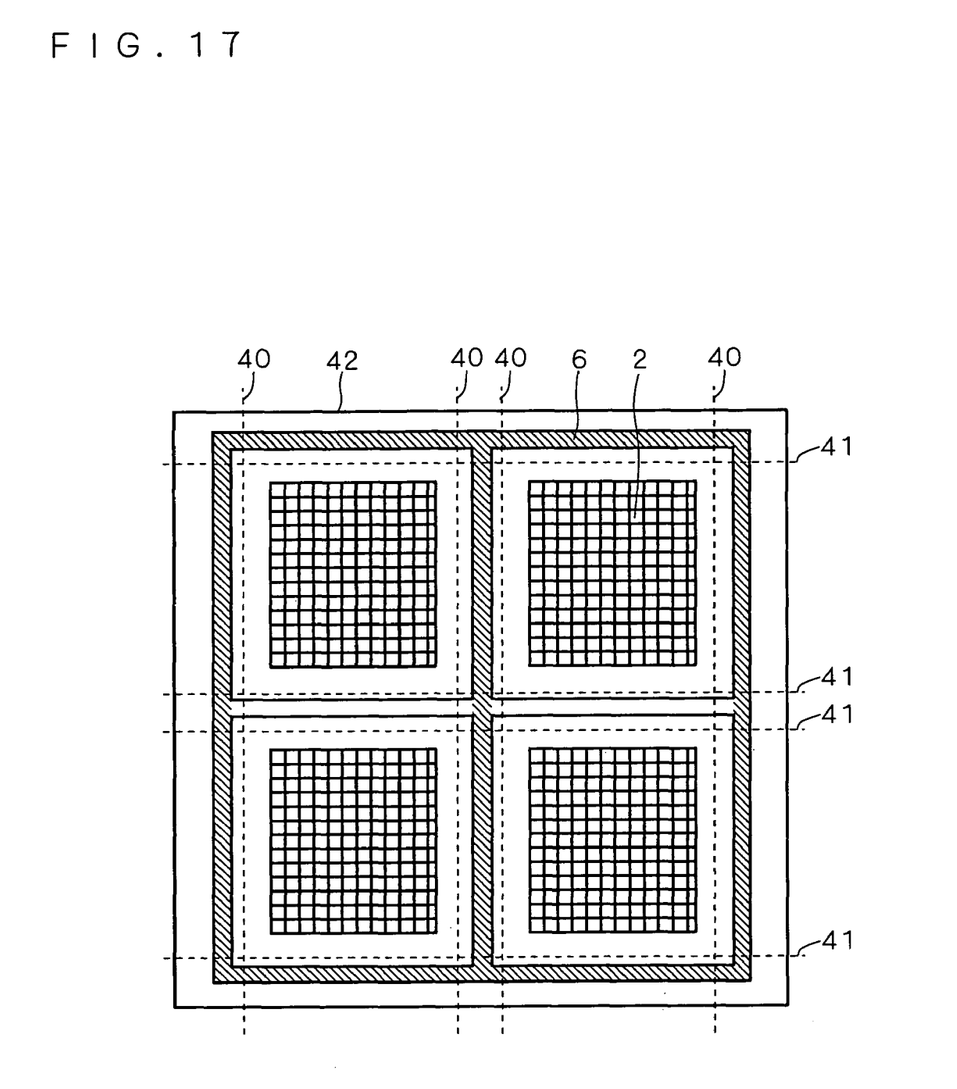
FIG. 17 is a plan view showing a state where the barrier is placed between divided display areas in accordance with a third preferred embodiment of the present invention.

FIG. 17 shows the third preferred embodiment in which the barrier 6 is formed to acquire the foreign matters in a method where a TFT array substrate formed of one glass substrate 42 is divided by a plurality of display areas to form TFT arrays at one time and after the panel assembly process is completed, the TFT arrays are divided to obtain a plurality of liquid crystal displays. In FIG. 17, four display areas 2 are arranged on one glass substrate 42 and the TFT array substrate and the counter substrate are divided by a plurality of longitudinal section lines 40 and a plurality of lateral section lines 41 whose number is determined in advance, to fabricate a plurality of liquid crystal displays of the same specification.

In FIG. 17, the barrier 6 is formed by the same manner as that in the first preferred embodiment on boundary areas and the outermost periphery of the four display areas 2 surrounded by the longitudinal section lines 40 and the lateral section lines 41. Also in the third preferred embodiment, as discussed above, since the barrier 6 is formed on the periphery of the display area 2, it is possible to acquire the foreign matters in the brush cleaning step of the panel assembly process, like in the first preferred embodiment.

In this case, since the barrier 6 is divided and discarded in assembly of the liquid crystal display, no barrier is left in the liquid crystal display 1.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a liquid crystal display in which a first substrate having a TFT array and a conductive film forming a pixel portion driven by said TFT array in a display area, and a second substrate are bonded with a gap interposed therebetween and a liquid crystal is held in said gap, comprising:
    a TFT array forming step of forming said TFT array on said first substrate in a first region and forming a barrier of the same materials as a plurality of materials constituting said TFT array in a second region different from said first region in at least part of a neighborhood of said display area at the same time; and
    a contact hole forming step of forming a contact hole for connecting a source terminal or a drain terminal in said TFT to said conductive film and etching a contour of said barrier at the same time wherein after the etching of the contour of the barrier, the first substrate is exposed between the first and second region.

2. The method of manufacturing a liquid crystal display according to claim 1, wherein:
    said conductive film is omitted from said materials constituting said barrier.

3. The method of manufacturing a liquid crystal display according to claim 1, wherein:
    said TFT array forming step includes the step of forming said barrier having a gate insulating film or a protection film on its side wall surface.

4. The method of manufacturing a liquid crystal display according to claim 1, further comprising:
    a cleaning step of passing a cleaning brush by said barrier while keeping in contact therebetween and then cleaning said first substrate while keeping in contact between said cleaning brush and said display area.

5. The method of manufacturing a liquid crystal display according to claim 1, further comprising:
    an orientation film forming step of forming orientation films for orienting said liquid crystal on said display area on which said TFT array is formed and on an upper portion of said barrier at the same time.

6. The method of manufacturing a liquid crystal display according to claim 5, wherein an orientation film on said barrier is so formed as to be higher than the average level of an orientation film formed on said display area in said orientation film forming step.

7. The method of manufacturing a liquid crystal display according to claim 5, further comprising:
    a rubbing step of passing a rubbing cloth by said orientation film on said barrier while keeping in contact therebetween and then performing rubbing while keeping in contact between said rubbing cloth and said orientation film on said display area.

8. The method of manufacturing a liquid crystal display according to claim 1, wherein
    said TFT array is formed in each of a plurality of divided display areas provided on said first substrate and said barrier is formed on a boundary for dividing said display areas at the same time in said TFT array forming step.

9. The method of manufacturing a liquid crystal display according to claim 1, wherein
    said TFT array and said barrier are positioned between said display area and a terminal region for connecting a liquid crystal driving circuit provided outside said display area, in at least one of a gap between adjacent gate driving lines and a gap between adjacent source driving lines in said TFT array at the same time.

10. A liquid crystal display manufactured by said manufacturing method as defined in claim 9.

11. The method of manufacturing a liquid crystal display according to claim 9, wherein
    said conductive film is omitted from said materials constituting said barrier.

12. The method of manufacturing a liquid crystal display according to claim 9, wherein:
    said TFT array forming step includes the step of forming said barrier having a gate insulating film or a protection film on its side wall surface.

13. The method of manufacturing a liquid crystal display according to claim 9, further comprising:
    a cleaning step of passing a cleaning brush by said barrier while keeping in contact therebetween and then cleaning said first substrate while keeping in contact between said cleaning brush and said display area.

14. The method of manufacturing a liquid crystal display according to claim 9, further comprising:
    an orientation film forming step of forming orientation films for orienting said liquid crystal on said display area on which said TFT array is formed and on an upper portion of said barrier at the same time.

15. The method of manufacturing a liquid crystal display according to claim 9, wherein
    said TFT array is formed in each of a plurality of divided display areas provided on said first substrate and said barrier is formed on a boundary for dividing said display areas at the same time in said TFT array forming step.

16. A liquid crystal display manufactured by said manufacturing method as defined in claim 1.

17. A liquid crystal display in which a first substrate having a TFT array formed in a first region and a conductive film forming a pixel portion driven by said TFT array in a display area, and a second substrate are bonded with a gap interposed therebetween and a liquid crystal is held in said gap, comprising:
    a barrier formed in a second region different from the first region of the same materials as a plurality of materials constituting said TFT array in at least part of the neighborhood of said display area at the same time, wherein said barrier has a level difference between neighborhood of said display area wherein the first substrate is exposed between the first and second region after etching the contour of the barrier.

18. The liquid crystal display according to claim 17, wherein said conductive film is omitted from said materials constituting said barrier.

19. The liquid crystal display according to claim 17, wherein said barrier has a gate insulating film or a protection film on its side wall surface.

20. The liquid crystal display according to claim 17, wherein a height of a surface of an orientation film on said barrier from a surface of a glass substrate is so formed as to be higher than an average level of a surface of an orientation film formed on said display area.

21. The liquid crystal display according to claim 17, wherein
   in each of a plurality of divided display areas provided on said first substrate, said barrier is formed on a boundary for dividing said display areas.

22. The liquid crystal display according to claim 17, wherein
   said first substrate is positioned between said display area and a terminal region for connecting a liquid crystal driving circuit provided outside of said display area, in at least one of a gap between adjacent gate driving lines and a gap between adjacent source driving lines in said TFT array at the same time.

* * * * *